United States Patent [19]

Thompson

[11] 4,219,037

[45] Aug. 26, 1980

[54] PROTECTIVE CRUTCH NUT

[76] Inventor: Johnnie W. Thompson, Rte. 3, Box 263, Pelzer, S.C. 29669

[21] Appl. No.: 904,200

[22] Filed: May 9, 1978

[51] Int. Cl.$^2$ .......................... A45B 9/00; F16B 37/00

[52] U.S. Cl. ....................................... 135/69; 85/32 R

[58] Field of Search .................... 85/32 R, 35; 151/44, 151/34; D8/397; 135/68, 69, 70, 71, 72, 73; 151/41.7, 55

[56] References Cited

U.S. PATENT DOCUMENTS

| | | | |
|---|---|---|---|
| 1,263,910 | 4/1918 | Sowell et al. | 151/38 |
| 1,383,156 | 6/1921 | Sherman | 135/69 |
| 1,742,201 | 1/1930 | Drissner | 85/32 R X |
| 2,046,571 | 7/1936 | McCain | 85/32 R X |
| 2,346,448 | 4/1944 | Nobutt et al. | 85/32 R X |
| 2,408,604 | 10/1946 | Brickson | 135/69 |
| 2,582,657 | 1/1952 | Serner | 85/32 R X |
| 3,025,853 | 3/1962 | Mason | 85/32 R X |

FOREIGN PATENT DOCUMENTS

| | | | |
|---|---|---|---|
| 164598 | 4/1949 | Austria | 85/32 R |
| 1234053 | 6/1971 | United Kingdom | 135/69 |

*Primary Examiner*—Thomas J. Holko

*Attorney, Agent, or Firm*—Bailey, Dority & Flint

[57] ABSTRACT

A crutch nut is disclosed as a fastener for the legs of a crutch frame that supports the load exerted on the frame without damage to the structure and which eliminates the punching and tearing of clothing, seat covers, and the like.

4 Claims, 5 Drawing Figures

PROTECTIVE CRUTCH NUT

BACKGROUND OF THE INVENTION

It is typical to fasten the adjusting bolts which secure in place the legs of a crutch frame by utilizing a wing-type nut. However, the problem arises that this type of fastener, while convenient to use, is highly susceptible to being caught on clothing, seat covers and the like during use of the crutches resulting in tearing of fabrics. Moreover, conventional fasteners typically have a small surface portion for engaging the wood of the crutch leg which after prolonged use can on over tightening weaken the wood frame around the holes therein and lead to failure under the weight of the user.

Accordingly, an important object of the present invention is to provide a crutch nut for securing the adjusting bolts of crutch frames which protects against snagging and tearing of article fabrics during use.

Another important object of the present invention is to provide a crutch nut having a load-bearing surface which reduces the unit force exerted against the crutch frame and can be tightened thereagainst without weakening the crutch frame.

SUMMARY OF THE INVENTION

It has been found that a protective crutch nut for fastening the adjusting bolts of a crutch frame which affords protection against weakening of the crutch frame structure and tearing of adjacent article fabric can be had by providing a rounded ellipsoidal shaped head having a smooth rounded exterior surface, a pair of diametrically opposed tab portions defined by extensions of the exterior surface, and a planar load-bearing surface coextending between said pair of tab portions and the periphery of the head affording an enlarged flat surface for bearing against the crutch frame with the head tabs extending on either side of the frame leg interlocking therewith.

BRIEF DESCRIPTION OF THE DRAWING

The construction designed to carry out the invention will be hereinafter described, together with other features thereof.

The invention will be more readily understood from a reading of the following specification and by reference to the accompanying drawing(s) forming a part thereof, wherein an example of the invention is shown and wherein.

DESCRIPTION OF THE PREFERRED EMBODIMENT

Figure 1:
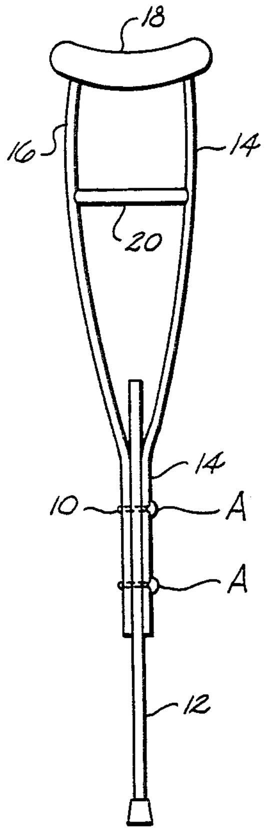
FIG. 1 is an elevation of a crutch utilizing crutch nuts according to the invention.
Figure 2:
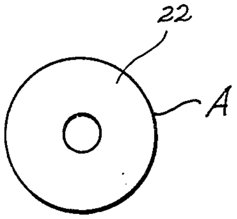
FIG. 2 is a top plan view illustrating a crutch nut according to the present invention.
Figure 3:
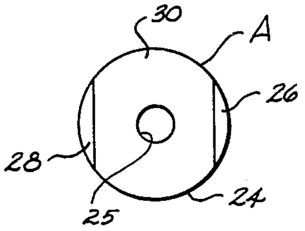
FIG. 3 is a bottom plan view illustrating a crutch nut according to the present invention.
Figure 4:
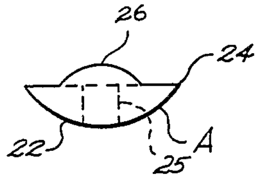
FIG. 4 is an elevation illustrating a crutch nut according to the present invention.
Figure 5:
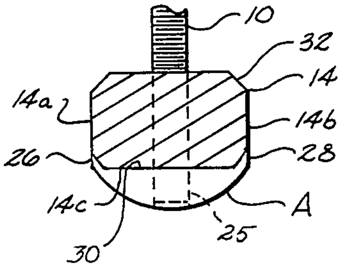
FIG. 5 is an elevation illustrating a crutch nut according to the present invention interlocking and bearing against the crutch frame.

The drawing illustrates a crutch nut, designated as A, for fastening crutch adjusting bolts 10 to secure the legs of a crutch frame in place. A typical frame crutch is illustrated as including a leg 12 which is adjustable in its length with respect to Y-frame legs 14 and 16 between which the adjustable leg 12 is carried, an arm support 18, and a hand support 20. The crutch bolts 10 are received in aligned openings formed in crutch frame legs 16 and 14 and adjustable frame leg 12.

As illustrated, the protective crutch nut A includes a rounded and generally ellipsoidal shaped nut head 22 having a smooth rounded exterior top surface with no sharp edges affording protection against tearing and snagging of fabric thereby. The rounded exterior surface of the head 22 terminates at a peripheral edge 24 which has a general form of a conic section and, as illustrated, is circular. A threaded aperture 25 is provided centrally in the nut head for receiving the crutch bolt 10. A pair of diametrically opposed tab portions 26 and 28 are provided by extensions of the nut head surface past the peripheral edge 24. The tab portions 26 and 28 engage opposing sides **14*a* and 14*b* of the crutch frame leg 14 and interlock therewith to provide a clamp during tightening of the crutch bolt and nut. A planar load-bearing surface 30 coextends between the tab portions 26 and 28 and the remaining portion of the peripheral edge 24 defined generally by a plane section through the ellipsoidal head body. The planar load-bearing surface bears against the face 14*c* of the frame leg 14** and distributes the thrust of the load or force created by tightening of the crutch frame bolt evenly over the flat load-bearing surface and the frame leg engaged thereby.

Due to the enlarged area of the load-bearing surface, the pressure per square inch exerted onto the wooden frame by the tightening of the crutch nut thereagainst is reduced considerably over that of prior crutch fasteners. By utilizing a solid load-bearing surface 30, there are not sharp edges presented at the periphery thereof. It is of particular importance in application to a wooden crutch frame wherein prolonged use and/or overtightening of conventional fasteners weakens the frame of the leg biting into the area around the hole receiving the crutch bolt which can result in failure of the structure under the weight of the user.

It is important to note that the tabs 26 and 28, extending outwardly from the load-bearing surface 30, act as a clamp on the sides of the frame leg and that they maintain the crutch nut from turning under the high torque of tightening of the crutch frame bolt 10 without biting or digging into the face of the wooden frame leg. Typically, the wooden frame legs of the crutch have slightly beveled or rounded edges such as at 32 to avoid sharp edges. The tab portions 26 and 28 make an angle with the load-bearing surface 30 which matches or conforms generally to that of the beveled edges or shape of the edges of the wooden frame leg so that the torque during tightening is distributed evenly along this angle rather than on the edge.

Thus, it can be seen that an advantageous construction for a crutch frame nut can be had in accordance with the present invention which reduces the thrust load per unit area created by tightening of the crutch frame bolt exerted around the holes in the wooden frame leg to prevent weakening of the frame structure in this area while affording a smooth rounded exterior head surface which does not require a sharp edge by which to hold the nut during tightening.

While a preferred embodiment of the invention has been described using specific term, such description is for illustrative purposes only, and it is to be understood that changes and variations may be made without departing from the spirit or scope of the following claims.

What is claimed is:

1. In a crutch-frame assembly for supporting the weight of a patient, a protective crutch nut for fastening the adjusting bolts of a leg of the crutch frame comprising:

a rounded nut head having a smooth rounded exterior surface affording protection against snagging, said rounded exterior surface terminating at a peripheral edge;

a pair of diametrically opposed tab portions defined by extensions of said rounded surface of said head extending past said peripheral edge;

said tab portions being spaced about said peripheral edge to define an open space therebetween for receiving said crutch frame leg;

said tab portion having a smooth rounded edge portion blended with the peripheral edge of said nut head;

said tab portions engaging opposing outer sides of said leg of said crutch frame interlocking therewith; and said nut head further including a planar load-bearing surface coextending between said pair of tab portions and said peripheral edge of said head providing an enlarged surface for bearing against the exterior surface of said crutch frame leg affording a reduced unit force against said frame leg, whereby positive interlocking is afforded without signigicant overlapping of said rounded nut head with said crutch frame leg.

2. The device of claim 1 wherein said nut head is a solid body having a generally ellipsoidal shape.

3. The device of claim 2 wherein said rounded exterior surface terminates in a peripheral edge having the general form of a conic section.

4. The device of claim 1 wherein the angle of said tab portions with said planar load-bearing surface conforms generally with the angle of the edges of said crutch frame.

* * * * *